United States Patent
Nett et al.

(10) Patent No.: US 12,518,869 B2
(45) Date of Patent: Jan. 6, 2026

(54) SYSTEM AND METHOD FOR AUTOMATED LONGITUDINAL REVIEW

(71) Applicant: GE Precision Healthcare LLC, Wauwatosa, WI (US)

(72) Inventors: Brian Edward Nett, Wauwatosa, WI (US); Bradley Jay Gabrielse, Brookfield, WI (US); Prakhar Prakash, Milwaukee, WI (US); Sandeep Dutta, Celebration, FL (US)

(73) Assignee: GE Precision Healthcare LLC, Wauwatosa, WI (US)

( * ) Notice: Subject to any disclaimer, the term of this patent is extended or adjusted under 35 U.S.C. 154(b) by 364 days.

(21) Appl. No.: 18/111,159

(22) Filed: Feb. 17, 2023

(65) Prior Publication Data
US 2024/0282431 A1      Aug. 22, 2024

(51) Int. Cl.
*G06K 9/00*    (2022.01)
*G06T 7/00*    (2017.01)
(Continued)

(52) U.S. Cl.
CPC ........... *G16H 30/20* (2018.01); *G06T 7/0014* (2013.01); *G06T 7/37* (2017.01); *G06T 7/38* (2017.01);
(Continued)

(58) Field of Classification Search
CPC ........ G16H 30/20; G16H 30/40; G16H 50/20; G16H 10/20; G06T 7/0014; G06T 7/37;
(Continued)

(56) References Cited

U.S. PATENT DOCUMENTS

| | | | |
|---|---|---|---|
| 2007/0071294 A1* | 3/2007 | Mahesh | G16H 50/20 382/128 |
| 2008/0008401 A1* | 1/2008 | Zhu | G16H 40/63 382/294 |

(Continued)

FOREIGN PATENT DOCUMENTS

| | | |
|---|---|---|
| JP | H07148155 A | 6/1995 |
| JP | 2018106560 A | 7/2018 |

OTHER PUBLICATIONS

EP application 24158004.2 filed Feb. 16, 2024—extended Search Report issued Jul. 17, 2024; 10 pages.

(Continued)

*Primary Examiner* — Atiba O Fitzpatrick
(74) *Attorney, Agent, or Firm* — Fletcher Yoder, P.C.

(57) ABSTRACT

A computer-implemented method for automatically performing a longitudinal review of medical imaging data via one or more processors includes obtaining, at a computing device, a first image volume acquired of a subject with a medical imaging system of an imaging modality. The method also includes obtaining, at the computing device, a second image volume acquired of the subject with the medical imaging system or another medical imaging system of the imaging modality or a different imaging modality, wherein the first image volume was acquired at an earlier time point than the second image volume. The method further includes automatically aligning, via the computing device, the second image volume to the first image volume to generate aligned image volumes.

3 Claims, 10 Drawing Sheets

(51) Int. Cl.
- *G06T 7/37* (2017.01)
- *G06T 7/38* (2017.01)
- *G06T 11/00* (2006.01)
- *G16H 30/20* (2018.01)

(52) U.S. Cl.
CPC .. *G06T 11/008* (2013.01); *G06T 2207/30104* (2013.01); *G06T 2211/404* (2013.01)

(58) Field of Classification Search
CPC ............ G06T 11/008; G06T 2211/404; G06T 2207/10016; G06T 7/0012–0016; G06T 2207/10064–10136; G06T 2207/30004–30104; G06T 7/30–38; G06T 7/70–77; A61B 6/032; A61B 6/5235; A61B 6/5247; G06V 2201/03–034; G06V 10/24–248; G06V 10/75–761

See application file for complete search history.

(56) References Cited

U.S. PATENT DOCUMENTS

| | | | | |
|---|---|---|---|---|
| 2009/0123052 | A1* | 5/2009 | Ruth | A61B 6/025 |
| | | | | 382/132 |
| 2009/0213034 | A1* | 8/2009 | Wu | G16H 50/20 |
| | | | | 715/788 |
| 2013/0129198 | A1* | 5/2013 | Sherman | G16H 30/20 |
| | | | | 382/159 |
| 2015/0065803 | A1* | 3/2015 | Douglas | G06T 7/143 |
| | | | | 600/200 |
| 2015/0139514 | A1* | 5/2015 | Mohr | G06T 5/50 |
| | | | | 382/131 |
| 2019/0164643 | A1* | 5/2019 | Heismann | G16H 30/20 |
| 2020/0405148 | A1* | 12/2020 | Tran | A61B 3/0008 |
| 2021/0158930 | A1* | 5/2021 | Tweedie | G16H 30/40 |
| 2021/0166391 | A1* | 6/2021 | Hermosillo Valadez | |
| | | | | G06T 7/38 |
| 2021/0279861 | A1 | 9/2021 | Macmahon | |
| 2022/0156904 | A1* | 5/2022 | Manhart | A61B 5/0033 |
| 2022/0414866 | A1* | 12/2022 | Price | H04W 7/026 |
| 2022/0414883 | A1* | 12/2022 | Shinagawa | G06F 18/22 |

OTHER PUBLICATIONS

JP application 2024-013824 filed 0FEB2024—Office Action issued Feb. 19, 2025; Machine Translation; 8 pages.
JP2018106560 Machine Translation; 37 pages.
JPH07148155 Machine Translation; 15 pages.

* cited by examiner

SYSTEM AND METHOD FOR AUTOMATED LONGITUDINAL REVIEW

BACKGROUND

The subject matter disclosed herein relates to imaging systems and, more particularly, to a system and a method for automated longitudinal review.

In computed tomography (CT), X-ray radiation spans an object or a subject of interest being scanned, such as a human patient, baggage, or other object, and a portion of the radiation impacts a detector where the image data is collected. In digital X-ray systems a photodetector produces signals representative of the amount or intensity of radiation impacting discrete pixel regions of a detector surface. The signals may then be processed to generate an image that may be displayed for review. In the images produced by such systems, it may be possible to identify and examine the internal structures and organs within a subject's body. In CT imaging systems a detector array, including a series of detector elements or sensors, produces similar signals through various positions as a gantry is displaced around a subject or object being imaged, allowing volumetric image reconstructions to be obtained.

In medical imaging contexts, such as those employing CT scanners (or other types of imaging scanners), it is common to perform follow-up studies involving at least two scans of the same patient acquired at different times, such as over the course of a treatment or therapy regime. Such procedures can be used to monitor or evaluate the physiological response to a medical treatment and can help planning further patient care. In the analysis of follow-up scans, a reviewer may compare the image values on relevant tissue regions or organs.

In practice, imaging follow-up studies may be performed using different protocols and/or parameters. The characteristics of the images acquired may therefore differ widely between studies, and even between successive scans of the same patient, which may be acquired months apart and/or using different scanners. These differences in image characteristics may be problematic in assessing follow-up images of a patient. In addition, there is not an automatic workflow for radiologists to compare present images to previous images under similar conditions or parameters. Further, there is no querying ability to access conditions or parameters for the previous images.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the subject matter. Indeed, the subject matter may encompass a variety of forms that may be similar to or different from the embodiments set forth below.

In one embodiment, a computer-implemented method for automatically performing a longitudinal review of medical imaging data via one or more processors is provided. The method includes obtaining, at a computing device, a first image volume acquired of a subject with a medical imaging system of an imaging modality. The method also includes obtaining, at the computing device, a second image volume acquired of the subject with the medical imaging system or another medical imaging system of the imaging modality or a different imaging modality, wherein the first image volume was acquired at an earlier time point than the second image volume. The method further includes automatically aligning, via the computing device, the second image volume to the first image volume to generate aligned image volumes.

In another embodiment, a system for automatically performing a longitudinal review of medical imaging data is provided. The system includes one or more memories encoding processor-executable routines. The system also includes one or more processors configured to access the one or more memories and to execute the processor-executable routines, wherein the routines, when executed by the one or more processors, cause the one or more processors to perform acts. The acts include obtaining, at a computing device, a first image volume acquired of a subject with a medical imaging system of an imaging modality. The acts also include obtaining, at the computing device, a second image volume acquired of the subject with the medical imaging system or another medical imaging system of the imaging modality or a different imaging modality, wherein the first image volume was acquired at an earlier time point than the second image volume. The acts further include automatically aligning, via the computing device, the second image volume to the first image volume to generate aligned image volumes.

In a further embodiment, a non-transitory computer-readable medium, the computer-readable medium including processor-executable code that when executed by one or more processors, causes the one or more processors to perform acts. The acts include obtaining, at a computing device, metadata of a first image volume acquired of a subject with a medical imaging system of an imaging modality. The acts also include obtaining, at the computing device, a second image volume acquired of the subject with the medical imaging system or another medical imaging system of the imaging modality or a different imaging modality, wherein the first image volume was acquired at an earlier time point than the second image volume. The acts further include automatically aligning, via the computing device, the second image volume to the first image volume to generate an aligned image volume for the second image volume based on the metadata.

BRIEF DESCRIPTION OF THE DRAWINGS

These and other features, aspects, and advantages of the disclosed subject matter will become better understood when the following detailed description is read with reference to the accompanying drawings in which like characters represent like parts throughout the drawings, wherein.

DETAILED DESCRIPTION

Figure 1:
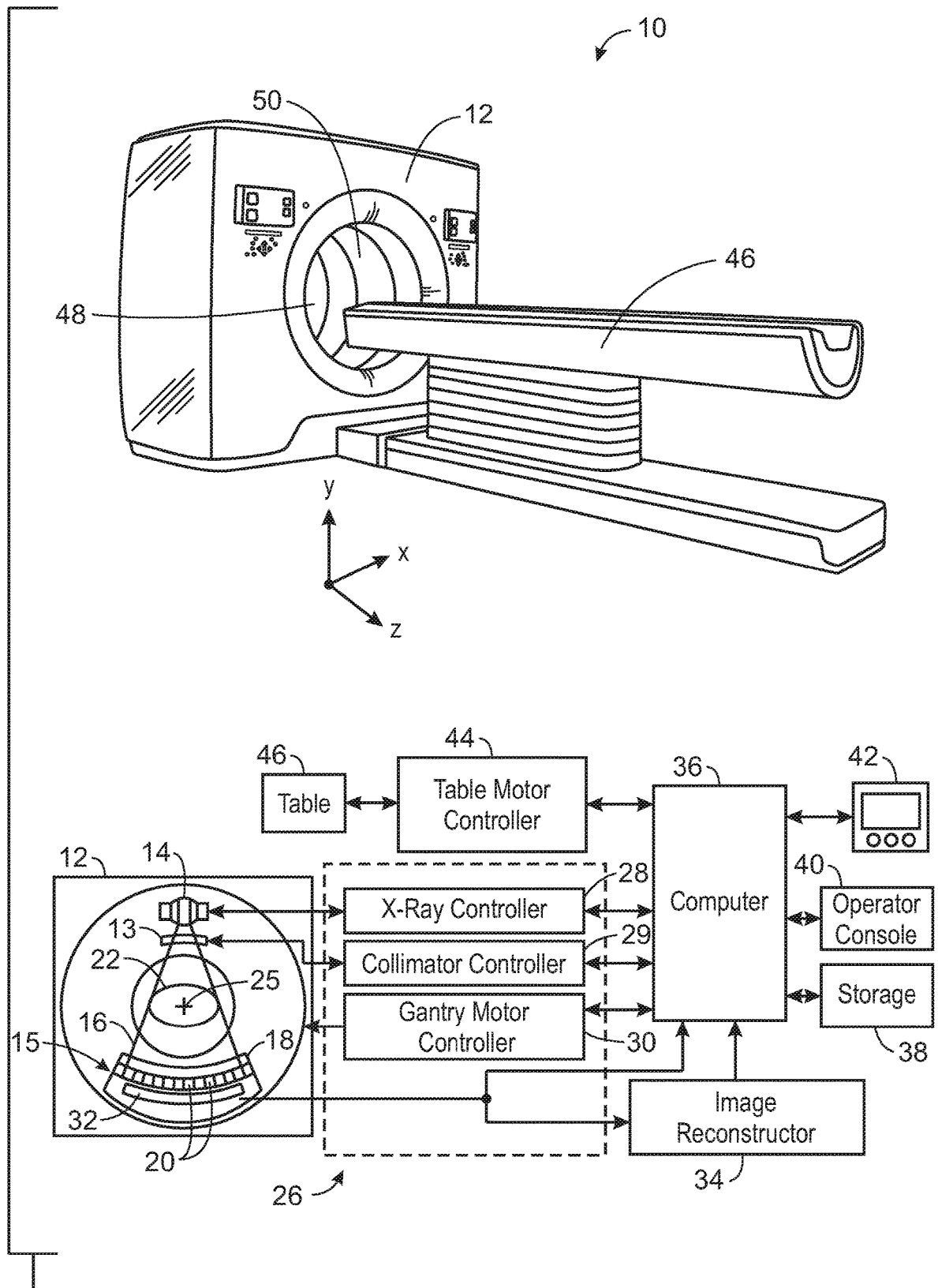
FIG. 1 is a combined pictorial view and block diagram of a computed tomography (CT) imaging system as discussed herein.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present subject matter, the articles "a," "an," "the," and "said" are intended to mean that there are one or more of the elements. The terms "comprising," "including," and "having" are intended to be inclusive and mean that there may be additional elements other than the listed elements. Furthermore, any numerical examples in the following discussion are intended to be non-limiting, and thus additional numerical values, ranges, and percentages are within the scope of the disclosed embodiments.

While aspects of the following discussion may be provided in the context of medical or health care imaging, it should be appreciated that the present techniques are not limited to such medical contexts. Indeed, the provision of examples and explanations in such a medical context is only to facilitate explanation by providing instances of real-world implementations and applications. However, the present approaches may also be utilized in other contexts, such as tomographic image reconstruction for industrial CT used in non-destructive inspection of manufactured parts or goods (i.e., quality control or quality review applications), and/or the non-invasive inspection of packages, boxes, luggage, and so forth (i.e., security or screening applications). In general, the present approaches may be useful in any imaging or screening context utilizing a CT imaging system or other imaging system.

The present disclosure provides embodiments for a system and a method for automatically performing a longitudinal review of medical imaging data. In particular, a computing device obtains a first image volume (or metadata of the first image volume) and obtains a second image volume, wherein the first image volume and the second image volume (of the same region of interest) are acquired of the patient at two different time points (e.g., on different days or on the same day) utilizing the same or different medical imaging systems of the same or different imaging modalities (e.g., CT imaging system, a magnetic resonance imaging (MRI) system, a positron emission tomography (PET) imaging system, or a single photon emission computed tomography (SPECT) imaging system). The computing device automatically aligns the second image volume to the first image volume to generate aligned image volumes. In certain embodiments, the computing device automatically aligns the second image volume to the first image volume to generate an aligned image for the second image volume based on the metadata of the first image volume. It should be noted an image volume can be of one image or several images.

Automatic alignment of the image volumes includes performing registration and transformation between the first image volume and the second image volume and, in certain embodiments, image overlaying. In certain embodiments, difference images may be generated by the computing device. The computing device straightens and orients the image volumes to a standard plane (e.g., axial planes perpendicular to table or planes related to anatomy that are created) and a matched plane (e.g., same orientation as the earlier image volume). An example of a standard plane would be a plane that connects the eye sockets to the head and planes parallel to that. Another example of a standard plane would be a symmetrical plane from the left to right side of the anatomy of the subject. In certain embodiments, the computing device may also perform a thickening operation on the image volumes.

In certain embodiments, the computing device may be separate from both the operator console of the medical imaging system and a remote access and storage system such as a picture archiving and communication system (PACS). In certain embodiments, the computing device is the operator console of the medical imaging system. In certain embodiments, the first image volume is obtained from the operator console of the medical imaging system. In certain embodiments, the first image volume is obtained from the remote access and storage system or PACS. The computing device transfers the aligned image volumes (e.g., properly oriented and aligned volumes) along with any difference images or image overlays to the PACS or another computing device for viewing. At the PACS (or another computing device), the aligned image volumes, difference images, and/or image overlay (e.g., from a time resolved imaging study utilizing CT angiography or CT perfusion) may be toggled (e.g., switched between) utilizing an input device. The disclosed embodiments provide an automatic workflow for radiologists to compare present images to previous images under similar conditions or parameters. As a result, the disclosed embodiments reduce the time needed to conduct a longitudinal review of the medical imaging data of a patient. It should be noted instead of a PACS system, a similar system may be utilized that functions similar to a PACS system in that it is located at a site remote from the scanner and can be utilized for the saving and viewing of an image volume.

Although the following discusses the disclosed embodiments with regard to CT imaging systems, the techniques described herein may apply to other types of imaging systems. For example, the disclosed techniques may apply to an MRI system or a nuclear medicine imaging system such as a PET imaging system or a SPECT imaging system. The disclosed techniques may also apply to medical imaging systems having a combination of the above medical imaging modalities.

With the preceding in mind and referring to FIG. 1, a computed tomography (CT) imaging system 10 is shown, by way of example. The CT imaging system 10 includes a gantry 12. The gantry 12 has an X-ray source 14 that projects a beam of X-rays 16 toward a detector assembly 15 on the opposite side of the gantry 12. The X-ray source 14 projects the beam of X-rays 16 through a pre-patient collimator assembly 13 that determines the size and shape of the beam of X-rays 16. The detector assembly 15 includes a collimator assembly 18 (a post-patient collimator assembly), a plurality of detector modules 20 (e.g., detector elements or sensors), and data acquisition systems (DAS) 32. The plurality of detector modules 20 detect the projected X-rays that pass through a subject or object 22 being imaged, and DAS 32 converts the data into digital signals for subsequent processing. Each detector module 20 in a conventional system produces an analog electrical signal that represents the intensity of an incident X-ray beam and hence the attenuated beam as it passes through the subject or object 22. During a scan to acquire X-ray projection data, gantry 12 and the components mounted thereon rotate about a center of rotation 25 (e.g., isocenter) so as to collect attenuation data from a plurality of view angles relative to the imaged volume.

Rotation of gantry 12 and the operation of X-ray source 14 are governed by a control system 26 of CT imaging system 10. Control system 26 includes an X-ray controller 28 that provides power and timing signals to an X-ray source 14, a collimator controller 29 that controls a length and a width of an aperture of the pre-patient collimator 13 (and, thus, the size and shape of the beam of X-rays 16), and a gantry motor controller 30 that controls the rotational speed and position of gantry 12. An image reconstructor 34 receives sampled and digitized X-ray data from DAS 32 and performs high-speed image reconstruction. The reconstructed image is applied as an input to a computer 36, which stores the image in a storage device 38. Computer 36 also receives commands and scanning parameters from an operator via console 40. An associated display 42 allows the operator to observe the reconstructed image and other data from computer 36. The operator supplied commands and parameters are used by computer 36 to provide control signals and information to DAS 32, X-ray controller 28, collimator controller 29, and gantry motor controller 30. In addition, computer 36 operates a table motor controller 44, which controls a motorized table 46 to position subject 22 and gantry 12. Particularly, table 46 moves portions of subject 22 through a gantry opening or bore 48.

Figure 2:
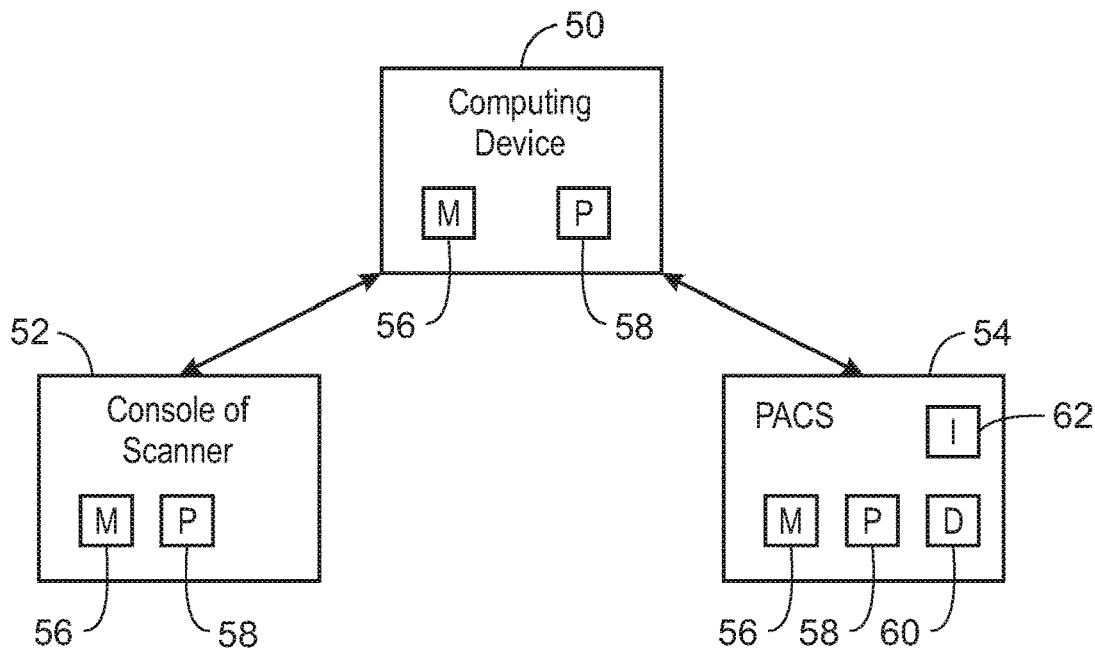
FIG. 2 is a schematic diagram of a computing device in communication with an operator console of a scanner of a medical imaging system and a picture archiving and communication system (PACS), in accordance with aspects of the present disclosure.

FIG. 2 is a schematic diagram of a computing device 50 in communication with an operator console 52 of a scanner of a medical imaging system (e.g., CT imaging system, MRI imaging system, PET imaging system, SPECT imaging system, etc.) and a picture archiving and communication system (PACS) 54. The computing device 50, the operator console 52, and the PACS 54 may be utilized in the techniques for automated longitudinal review of medical imaging data discussed herein. A longitudinal review is a comparison of a given image or set of images to another image or set of images which were acquired previously of the same patient or subject during the same exam session or on previous exam sessions. In certain embodiments, the computing device 50 and the operator console 52 may be the same device. In certain embodiments, the computing device 50 may be a remote cloud-based processing system solely utilized for processing. In certain embodiments, the PACS 54 may include individual remote workstations communicatively coupled to an archive (e.g., servers).

The computing device 50, the operator console 52, and the PACS 54 may include a memory 56 and a processor 58. In some embodiments, the processor 58 may include one or more general purpose processors, one or more application specific integrated circuits, one or more field programmable gate arrays, or the like. Additionally, the memory 56 may be any tangible, non-transitory, computer readable medium that is capable of storing instructions executable by the processor 58 and/or data that may be processed by the processor 104. In other words, the memory 56 may include volatile memory, such as random-access memory, or non-volatile memory, such as hard disk drives, read only memory, optical disks, flash memory, and the like. The memory 56 may store imaging data and metadata (e.g., setup parameters, orientation, etc.) related to the imaging data.

As described in greater detail below, the computing device 50 is configured to request and to obtain a first image volume (or metadata of the first image volume) and to obtain a second image volume, wherein the first image volume and the second image volume (of the same region of interest) are acquired of the patient at two different time points (e.g., on different days or on the same day) utilizing the same or different medical imaging systems of the same or different imaging modalities (e.g., CT imaging system, a MRI system, a PET imaging system, a SPECT imaging system, etc.). The computing device 50 is configured to automatically align the second image volume to the first image volume to generate aligned image volumes. In certain embodiments, the computing device 50 is configured to automatically align the second image volume to the first image volume to generate an aligned image for the second image volume based on the metadata of the first image volume. In particular, the computing device 50 is configured to automatically align image volumes by performing registration and transformation between the first image volume and the second image volume and, in certain embodiments, image overlaying. In certain embodiments, difference images may be generated by the computing device 50. The computing device 50 is configured to straighten and to orient the image volumes to a standard plane (e.g., axial planes perpendicular to table or planes related to anatomy that are created) and a matched plane (e.g., same orientation as the earlier image volume). In certain embodiments, the computing device 50 may also perform a thickening operation on the image volumes. The computing device 50 is configured to transfer or push the aligned image volumes (e.g., properly oriented and aligned volumes) along with any difference images or image overlays to the PACS 54 or another computing device for viewing.

The PACS 54 (in particular, a workstation of the PACS 54) may include a display 60 for viewing images. In addition, the PACS (the workstation of the PACS 54) may include an input device 62 (e.g., a keyboard, a mouse, a touchscreen (as part of the display 60), and so forth) to switch or toggle between the aligned image volumes, difference images, and/or image overlay (e.g., from a time resolved imaging study utilizing CT angiography or CT perfusion).

Figure 3:
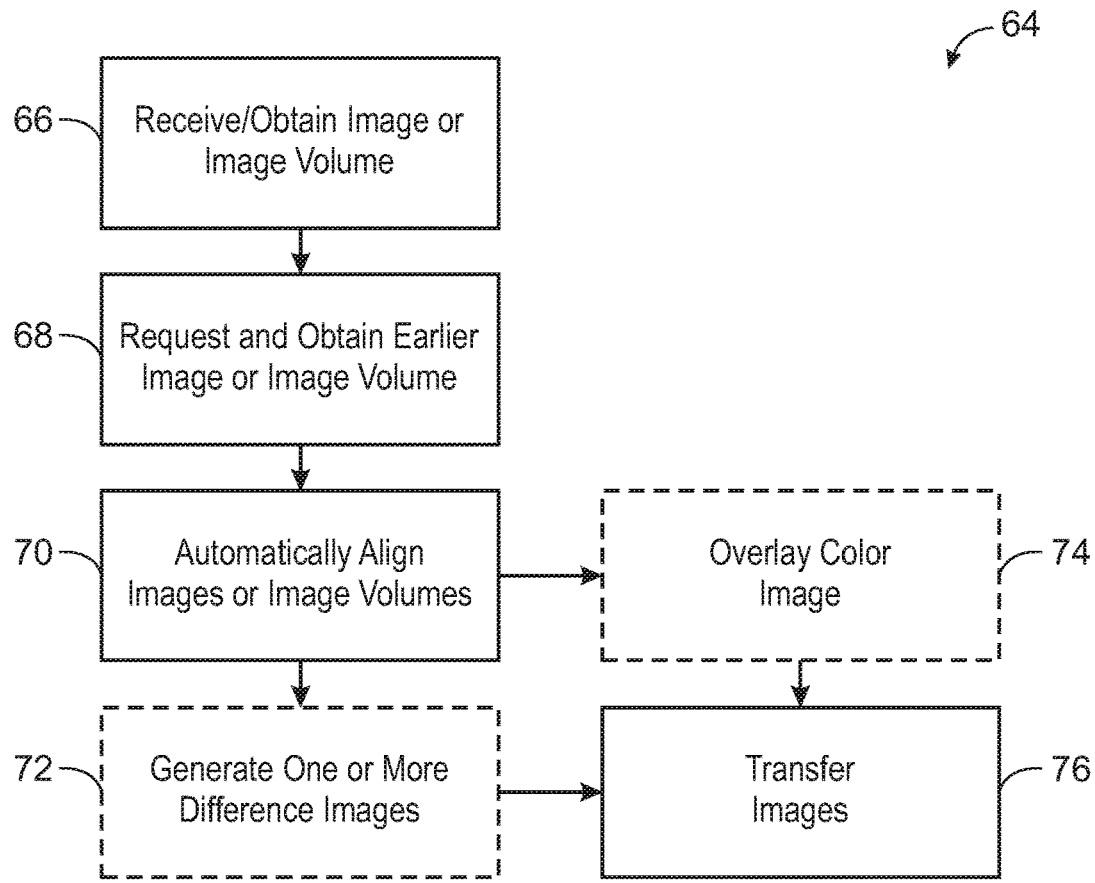
FIG. 3 is a flow chart of a method for automatically performing a longitudinal review of medical imaging data, in accordance with aspects of the present disclosure.

FIG. 3 is a flow chart of a method 64 for automatically performing a longitudinal review of medical imaging data. One or more steps of the method 64 may be performed by processing circuitry of the computing device 50 in FIG. 2. One or more of the steps of the method 64 may be performed simultaneously or in a different order from the order depicted in FIG. 3.

The method 64 includes receiving or obtaining, at a computing device (e.g., computing device 50 in FIG. 2), a present or current (e.g., just or recently acquired) image or image volume acquired (of a region of interest) of a subject (e.g., patient) acquired with a medical imaging system of an imaging modality (block 66). The present or current image or image volume may be received or obtained from an operator console of the medical image system utilized to acquire the present of current image volume. The method 64 also includes requesting and obtaining, via the computing device, an earlier image or image volume acquired (of the same region of interest) of the same subject with the same medical imaging system or a different medical imaging system (block 68). The imaging modalities (e.g., CT imaging, an MRI, a PET imaging, SPECT imaging, etc.) may be the same that were utilized for acquiring the present image or image volume and the earlier image or image volume. In certain embodiments, the imaging modalities may be different that were utilized for acquiring the present image or image volume and the earlier image or image volume. As noted, the images or image volumes of the subject are acquired at different time points. In certain embodiments, the images or image volumes are acquired on different days. In certain embodiments, the images or image volumes are acquired on the same day. In certain embodiments, the images or image volumes are acquired during the same scan but at different time points (e.g., a time resolved imaging study utilizing CT angiography or CT perfusion).

The method 64 further includes automatically aligning, via the computing device, the present image or image volume with or to the earlier image or image volume to generate aligned images or image volumes (block 70). In certain embodiments, the automatically aligning the images or image volumes includes performing registration and transformation between the present image or image volume and the earlier image or image volume to generate aligned images or image volumes. In particular, automatically aligning the images or image volumes includes straightening the images and image volumes and orientating the images or images volumes to a standard plane (e.g., axial planes perpendicular to table or planes related to anatomy that are created) and a matched plane (e.g., same orientation as the earlier image or image volume). In certain embodiments, the computing device may also perform a thickening operation on the image volumes.

In certain embodiments, the method 64 includes generating, via the computing device, one or more difference images or image volumes between the present image or image volume and the earlier image or image volume (block 72). The one or more difference images or image volumes are generated from the aligned images or image volumes derived from the present image or image volume and the earlier image or image volume (i.e., after registration).

In certain embodiments, the method 64 includes overlaying a color image on at least one of the aligned images or image volumes (e.g., aligned image or image volume of the earlier image or image volume) (block 74). In certain embodiments, the present image or image volume and the earlier image or image volume are obtained during a time resolved imaging study utilizing CT angiography or CT perfusion. In certain embodiments, the earlier image or image volume may be a non-contrast image or image volume and the present image or image volume may be a contrast image or image volume. In certain embodiments, the non-contrast image or image volume and the contrast image or image volume may be derived on the same day (and even from the same scan but at two different time points of the scan). The color image (from the contrast image or image volume) may be overlaid on a non-contrast image or image volume.

The method 64 even further includes transferring or pushing, via the computing device, the aligned images or image volumes to the PACS (e.g., workstation of the PACS) or another computing device for viewing (block 76). In certain embodiments, one or more difference images may be transferred or pushed as well to the PACS or another computer device for viewing. In certain embodiments, the overlay (e.g., of CT angiography or CT perfusion) may be transferred or pushed as well to the PACS or another computer device for viewing. On the workstation of the PACS or another computing device, a user (e.g., radiologist) may toggle (via an input device) between the aligned images or image volumes. In certain embodiments, on the workstation of the PACS or another computing device, a user (e.g., radiologist) may toggle (via an input device) between the aligned images or image volumes and the one or more difference images. In certain embodiments, on the workstation of the PACS or another computing device, a user (e.g., radiologist) may toggle (via an input device) between the aligned images or image volumes and the overlay (e.g., of CT angiography or CT perfusion).

Figure 4:
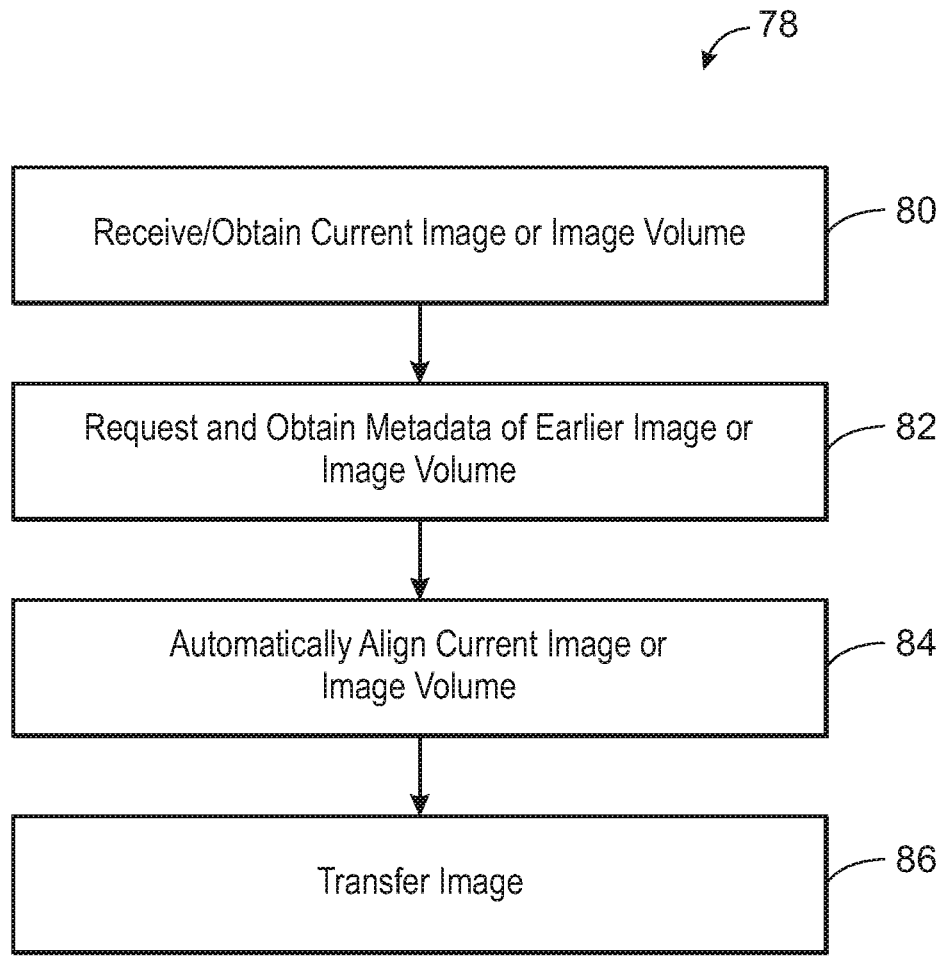
FIG. 4 is a flow chart of a method for automatically performing a longitudinal review of medical imaging data (e.g., utilizing metadata of an image volume), in accordance with aspects of the present disclosure.

FIG. 4 is a flow chart of a method 78 for automatically performing a longitudinal review of medical imaging data. One or more steps of the method 78 may be performed by processing circuitry of the computing device 50 in FIG. 2. One or more of the steps of the method 78 may be performed simultaneously or in a different order from the order depicted in FIG. 4.

The method 78 includes receiving or obtaining, at a computing device (e.g., computing device 50 in FIG. 2), a present or current (e.g., just or recently acquired) image or image volume acquired (of a region of interest) of a subject (e.g., patient) acquired with a medical imaging system of an imaging modality (block 80). The present or current image or image volume may be received or obtained from an operator console of the medical image system utilized to acquire the present of current image volume. The method 78 also includes requesting and obtaining, via the computing device, metadata of an earlier image or image volume acquired (of the same region of interest) of the same subject with the same medical imaging system or a different medical imaging system (block 82). The metadata may be provided in a header of the digital communications in medicine (DICOM) file for the earlier image or image volume. In certain embodiments, earlier image or image volume may also be provided as part of the DICOM file. The metadata may include setup parameters, orientation, and/or other information related to the earlier image or image volume. The imaging modalities (e.g., CT imaging, an MRI, a PET imaging, SPECT imaging, etc.) may be the same that were utilized for acquiring the present image or image volume and the earlier image or image volume. In certain embodiments, the imaging modalities may different that were utilized for acquiring the present image or image volume and the earlier image or image volume. As noted, the images or image volumes of the subject are acquired at different time points. In certain embodiments, the images or image volumes are acquired on different days. In certain embodiments, the images or image volumes are acquired on the same day. In certain embodiments, the images or image volumes are acquired during the same scan but at different time points (e.g., a time resolved imaging study utilizing CT angiography or CT perfusion).

The method 78 further includes automatically aligning, via the computing device, the present image or image volume with or to the earlier image or image volume to generate an aligned image or image volume (of the present image or image volume) based on the metadata of the earlier image or image volume (block 84). In certain embodiments, the automatic alignment may also utilize the earlier image or image volume in conjunction with the metadata. The method 78 even further includes transferring or pushing, via the computing device, the aligned image or image volume (of the present image or image volume) to the PACS (e.g., workstation of the PACS) or another computing device for viewing (block 86).

FIGS. 5-9 illustrate schematic diagrams of different automatic workflows for longitudinal review of medical image data. The automated workflows are shown utilizing an operator console of a CT scanner of a CT imaging system. In certain embodiments, the illustrated automated workflows may also be utilized with operator consoles of scanners of other image modalities besides CT (e.g., an MRI, a PET imaging, a SPECT imaging, etc.).

Figure 5:
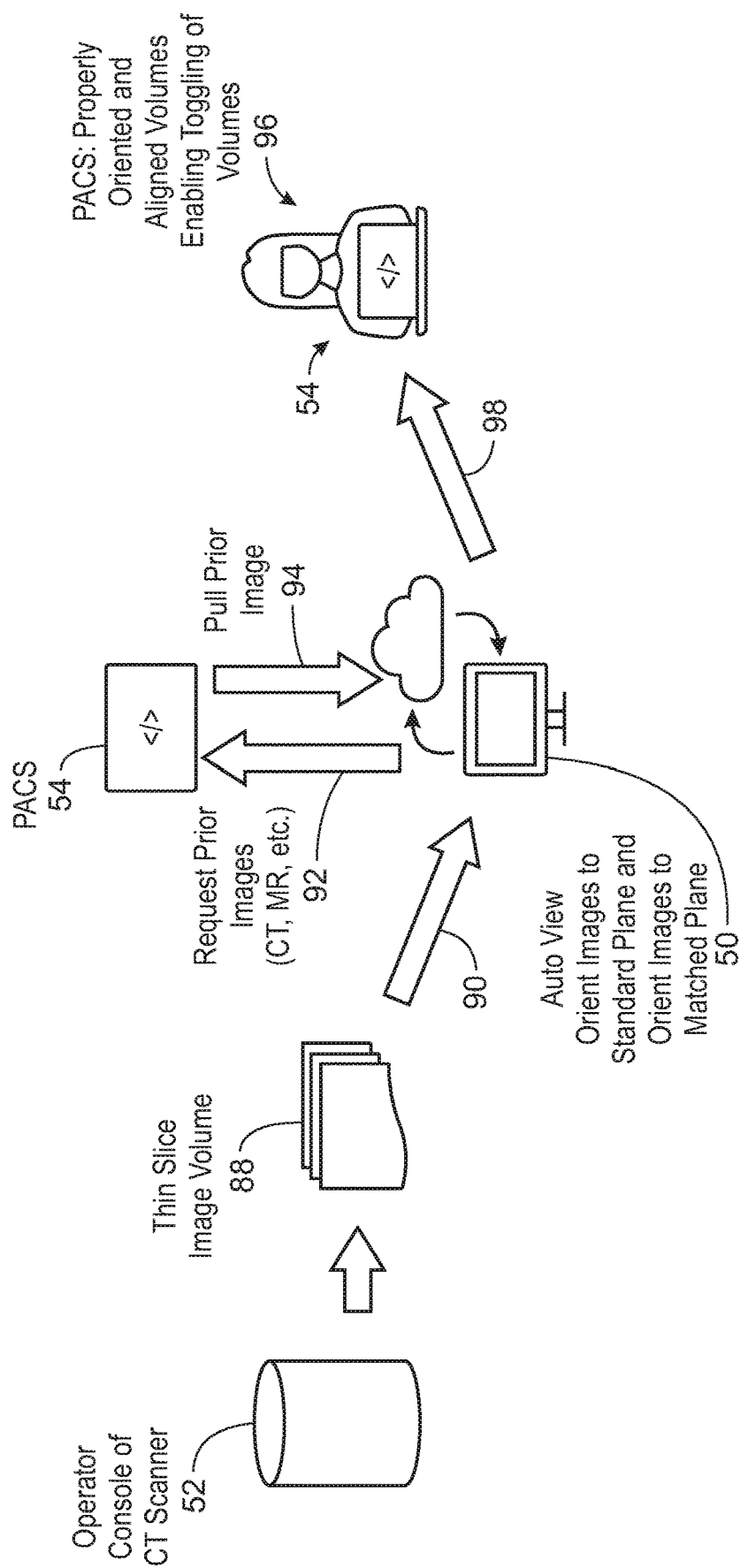
FIG. 5 is a schematic diagram of an automated workflow for a longitudinal review of imaging data (e.g., utilizing a computing device separate from an operator console and a PACS), in accordance with aspects of the present disclosure.

FIG. 5 is a schematic diagram of an automated workflow for a longitudinal review of imaging data (e.g., utilizing a computing device separate from an operator console and a PACS). As depicted, the computing device 50 is in communication with an operator console 52 of a CT scanner and the PACS 54. A presently or currently acquired image volume (e.g., thin slice image volume) acquired of a region of interest of a subject (e.g., patient) is provided to the computing device 50 as indicated by arrow 90. In response, the computing device 50 may request (e.g., automatically) a prior (or earlier) image volume of acquired of the same region of interest of the subject from the PACS 54 as indicated by the arrow 92. In certain embodiments, the prior image volume of the subject may have been acquired utilizing the same imaging modality (e.g., utilizing the same CT scanner or a different CT scanner). In certain embodiments, the prior image volume of the subject may have been acquired utilizing a different imaging modality (e.g., MRI, PET imaging, SPECT imaging, etc.). The prior image volume is provided (e.g., automatically) from the PACS 54 to the computing device 50 as indicated by arrow 94.

The computing device 50 then automatically aligns the presently acquired image volume 88 and the prior image volume. In particular, the computing device 50 performs registration and transformation between the presently acquired image volume and the prior image volume to generate aligned image volumes. In particular, the computing device 50 automatically aligns the image volumes by straightening image volumes and orientating the images volumes to a standard plane (e.g., axial planes perpendicular to table or planes related to anatomy that are created) and a matched plane (e.g., same orientation as the earlier image volume). In certain embodiments, the computing device 50 may also perform a thickening operation on the image volumes.

The computing device 50 then transfers or pushes (e.g., automatically) the aligned image volumes to a workstation 96 of the PACS 54 for viewing as indicated by arrow 98. On the workstation 96, the user (e.g., radiologist) may switch or toggle between the properly oriented and aligned image volumes utilizing an input device of the workstation 96.

Figure 6:
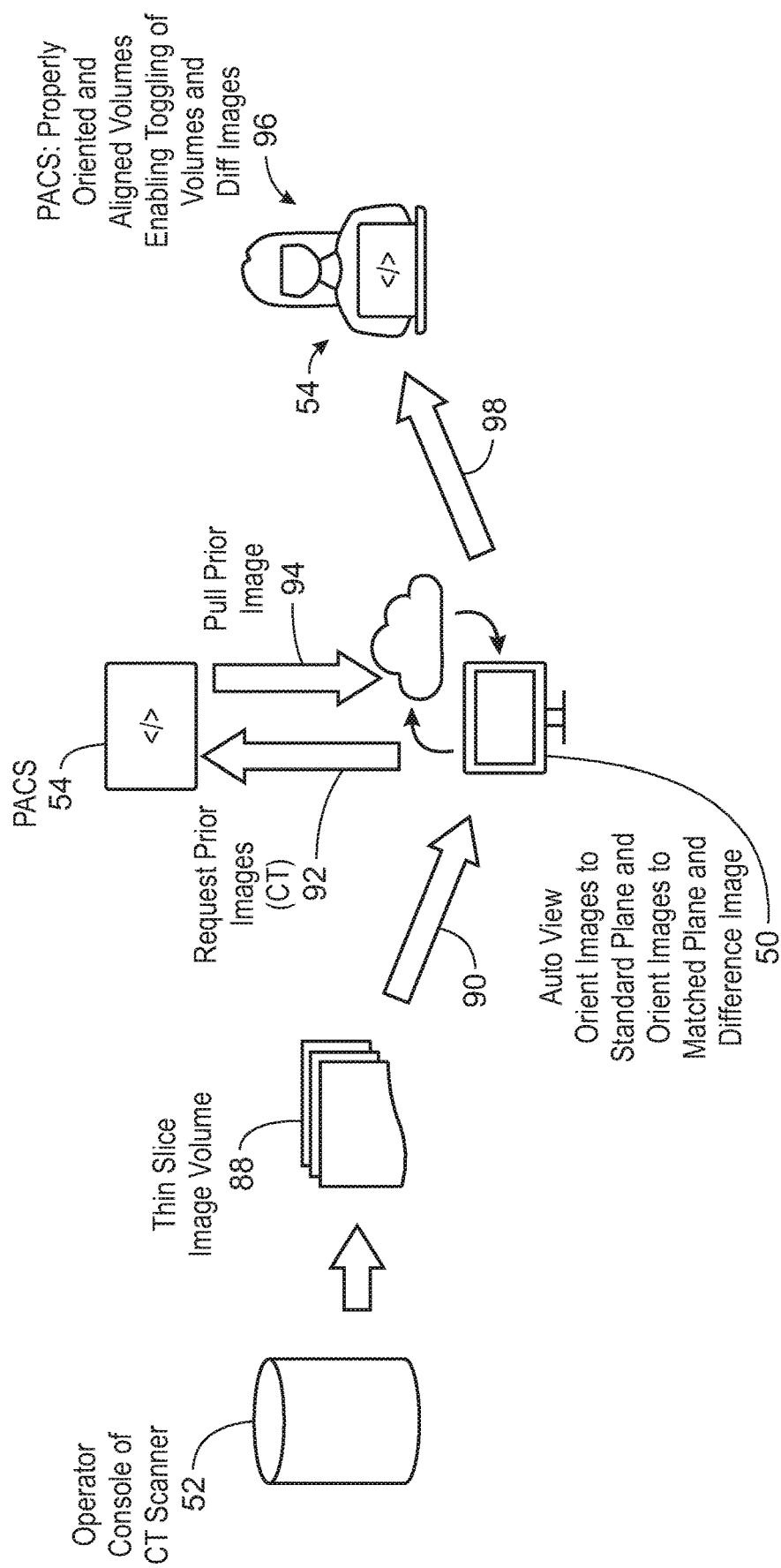
FIG. 6 is a schematic diagram of an automated workflow for a longitudinal review of imaging data (e.g., utilizing a computing device separate from an operator console and a PACS to generate one or more difference images), in accordance with aspects of the present disclosure.

FIG. 6 is a schematic diagram of an automated workflow for a longitudinal review of imaging data (e.g., utilizing a computing device separate from an operator console and a PACS to generate one or more difference images). As depicted, the computing device 50 is in communication with an operator console 52 of a CT scanner and the PACS 54. A presently or currently acquired image volume 88 (e.g., thin slice image volume) acquired of a region of interest of a subject (e.g., patient) is provided to the computing device 50 as indicated by arrow 90. In response, the computing device 50 may request (e.g., automatically) a prior (or earlier) image volume of acquired of the same region of interest of the subject from the PACS 54 as indicated by the arrow 92. The prior image volume of the subject was acquired utilizing the same imaging modality (e.g., utilizing the same CT scanner or a different CT scanner). The prior image volume is provided (e.g., automatically) from the PACS 54 to the computing device 50 as indicated by arrow 94.

The computing device 50 then automatically aligns the presently acquired image volume 88 and the prior image volume. In particular, the computing device 50 performs registration and transformation between the presently acquired image volume and the prior image volume to generate aligned image volumes. In particular, the computing device 50 automatically aligns the image volumes by straightening image volumes and orientating the images volumes to a standard plane (e.g., axial planes perpendicular to table or planes related to anatomy that are created) and a matched plane (e.g., same orientation as the earlier image volume). In certain embodiments, the computing device 50 may also perform a thickening operation on the image volumes. The computing device 50 also generates one or more difference images between the presently acquired image volume and the earlier image volume. The one or more difference images are generated from the aligned images or image volumes derived from the present image volume and the earlier image volume (i.e., after registration).

The computing device 50 then transfers or pushes (e.g., automatically) the aligned image volumes and the one or more difference images to a workstation 96 of the PACS 54 for viewing as indicated by arrow 98. On the workstation 96, the user (e.g., radiologist) may switch or toggle between the properly oriented and aligned image volumes as well as the one or more difference images utilizing an input device of the workstation 96.

Figure 7:
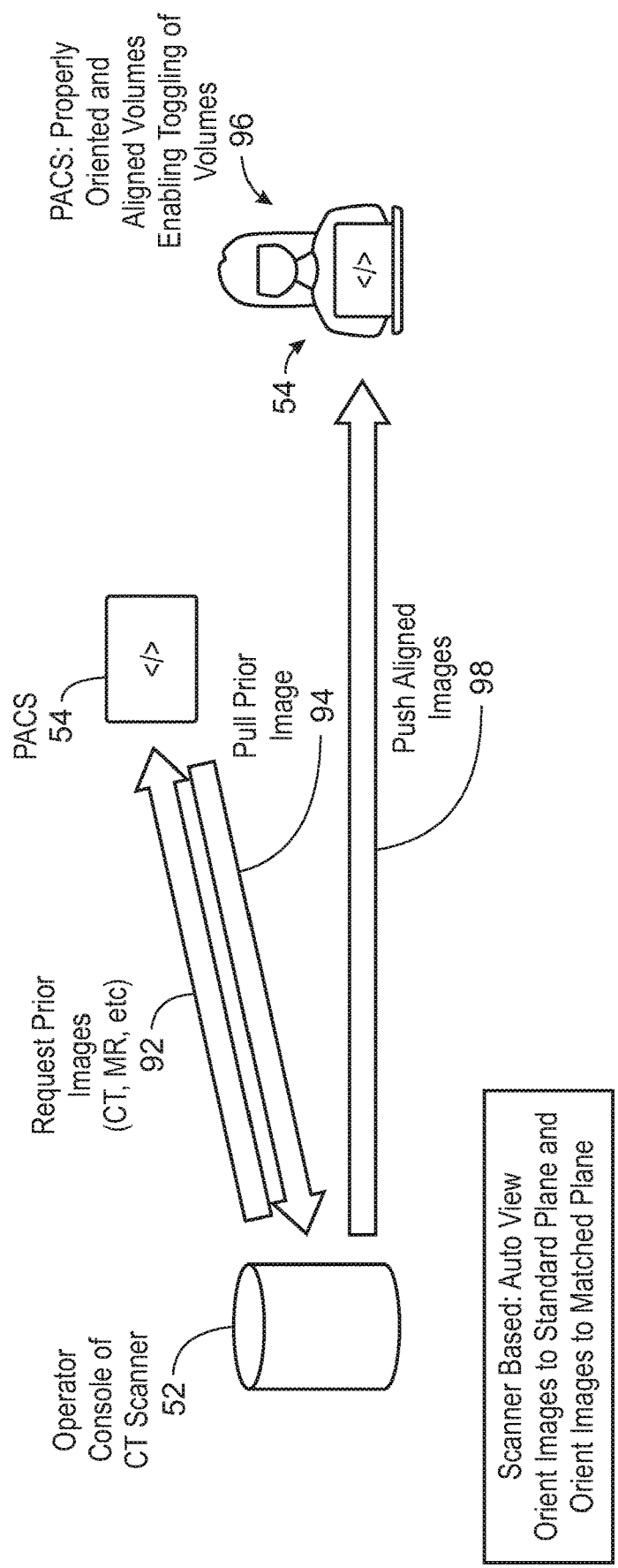
FIG. 7 is a schematic diagram of an automated workflow for a longitudinal review of imaging data (e.g., utilizing an operator console of a scanner), in accordance with aspects of the present disclosure.

FIG. 7 is a schematic diagram of an automated workflow for a longitudinal review of imaging data (e.g., utilizing an operator console of a scanner). As depicted, an operator console 52 of a CT scanner is communication with the PACS 54. A presently or currently acquired image volume (e.g., thin slice image volume) acquired of a region of interest of a subject (e.g., patient) by the CT scanner is obtained or accessed by the operator console 52. In response, the operator console 52 may request (e.g., automatically) a prior (or earlier) image volume of acquired of the same region of interest of the subject from the PACS 54 as indicated by the arrow 92. In certain embodiments, the prior image volume of the subject may have been acquired utilizing the same imaging modality (e.g., utilizing the same CT scanner or a different CT scanner). In certain embodiments, the prior image volume of the subject may have been acquired utilizing a different imaging modality (e.g., MRI, PET imaging, SPECT imaging, etc.). The prior image volume is provided (e.g., automatically) from the PACS 54 to the operator console 52 as indicated by arrow 94.

The operator console 52 then automatically aligns the presently acquired image volume and the prior image volume. In particular, the operator console 52 performs registration and transformation between the presently acquired image volume and the prior image volume to generate aligned image volumes. In particular, the operator console 52 automatically aligns the image volumes by straightening image volumes and orientating the images volumes to a standard plane (e.g., axial planes perpendicular to table or planes related to anatomy that are created) and a matched plane (e.g., same orientation as the earlier image volume). In certain embodiments, the operator console 52 may also perform a thickening operation on the image volumes.

The operator console 52 then transfers or pushes (e.g., automatically) the aligned image volumes to a workstation 96 of the PACS 54 for viewing as indicated by arrow 98. On the workstation 96, the user (e.g., radiologist) may switch or toggle between the properly oriented and aligned image volumes utilizing an input device of the workstation 96.

Figure 8:
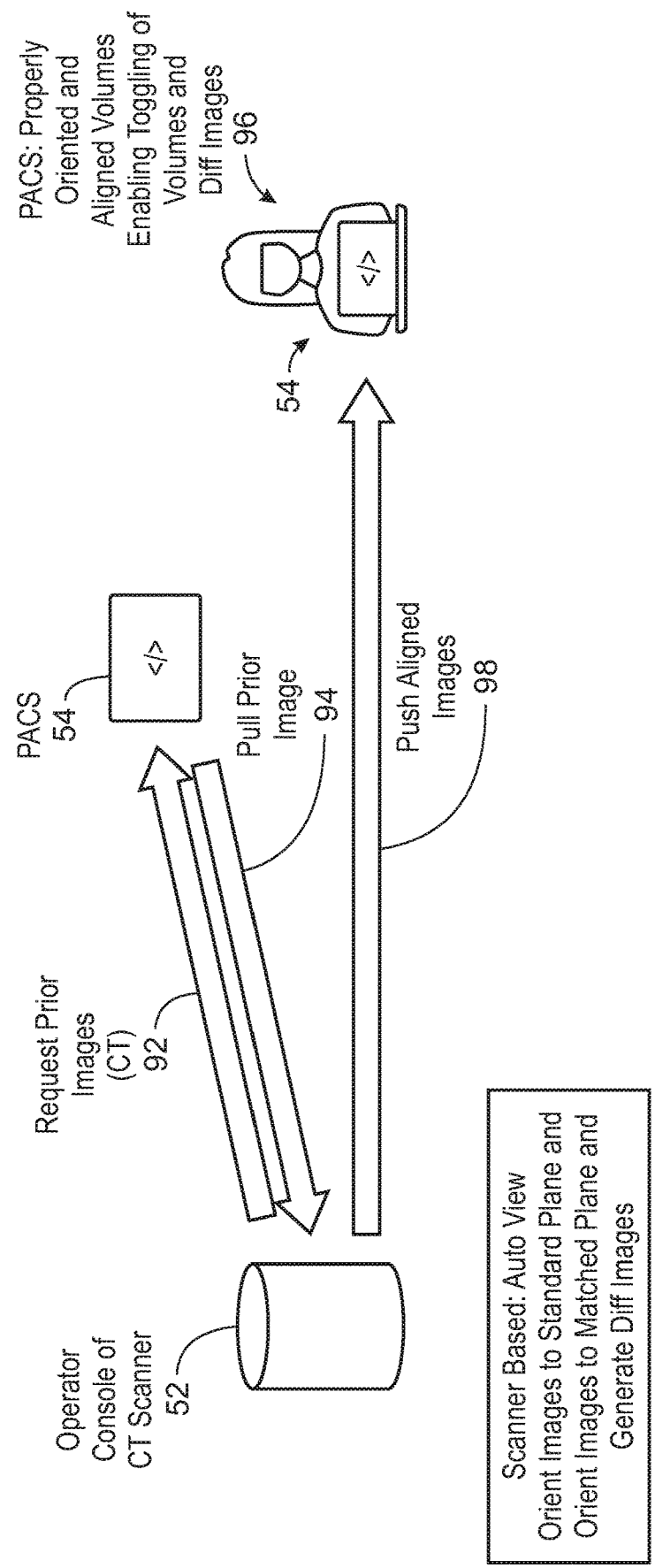
FIG. 8 is a schematic diagram of an automated workflow for a longitudinal review of imaging data (e.g., utilizing an operator console of a scanner to generate one or more difference images), in accordance with aspects of the present disclosure.

FIG. 8 is a schematic diagram of an automated workflow for a longitudinal review of imaging data (e.g., utilizing an operator console of a scanner to generate one or more difference images). A presently or currently acquired image volume (e.g., thin slice image volume) acquired of a region of interest of a subject (e.g., patient) by the CT scanner is obtained or accessed by the operation console 52. In response, the operator console 52 may request (e.g., automatically) a prior (or earlier) image volume of acquired of the same region of interest of the subject from the PACS 54 as indicated by the arrow 92. The prior image volume of the subject was acquired utilizing the same imaging modality (e.g., utilizing the same CT scanner or a different CT scanner). The prior image volume is provided (e.g., automatically) from the PACS 54 to the operator console 52 as indicated by arrow 94.

The operator console 52 then automatically aligns the presently acquired image volume and the prior image volume. In particular, the operator console 52 performs registration and transformation between the presently acquired image volume and the prior image volume to generate aligned image volumes. In particular, the operator console 52 automatically aligns the image volumes by straightening image volumes and orientating the images volumes to a standard plane (e.g., axial planes perpendicular to table or planes related to anatomy that are created) and a matched plane (e.g., same orientation as the earlier image volume). In certain embodiments, the operator console 52 may also perform a thickening operation on the image volumes. The operator console 52 also generates one or more difference images between the presently acquired image volume and the earlier image volume. The one or more difference images are generated from the aligned images or image volumes derived from the present image volume and the earlier image volume (i.e., after registration).

The operator console 52 then transfers or pushes (e.g., automatically) the aligned image volumes and the one or more difference images to a workstation 96 of the PACS 54 for viewing as indicated by arrow 98. On the workstation 96, the user (e.g., radiologist) may switch or toggle between the properly oriented and aligned image volumes as well as the one or more difference images utilizing an input device of the workstation 96.

Figure 9:
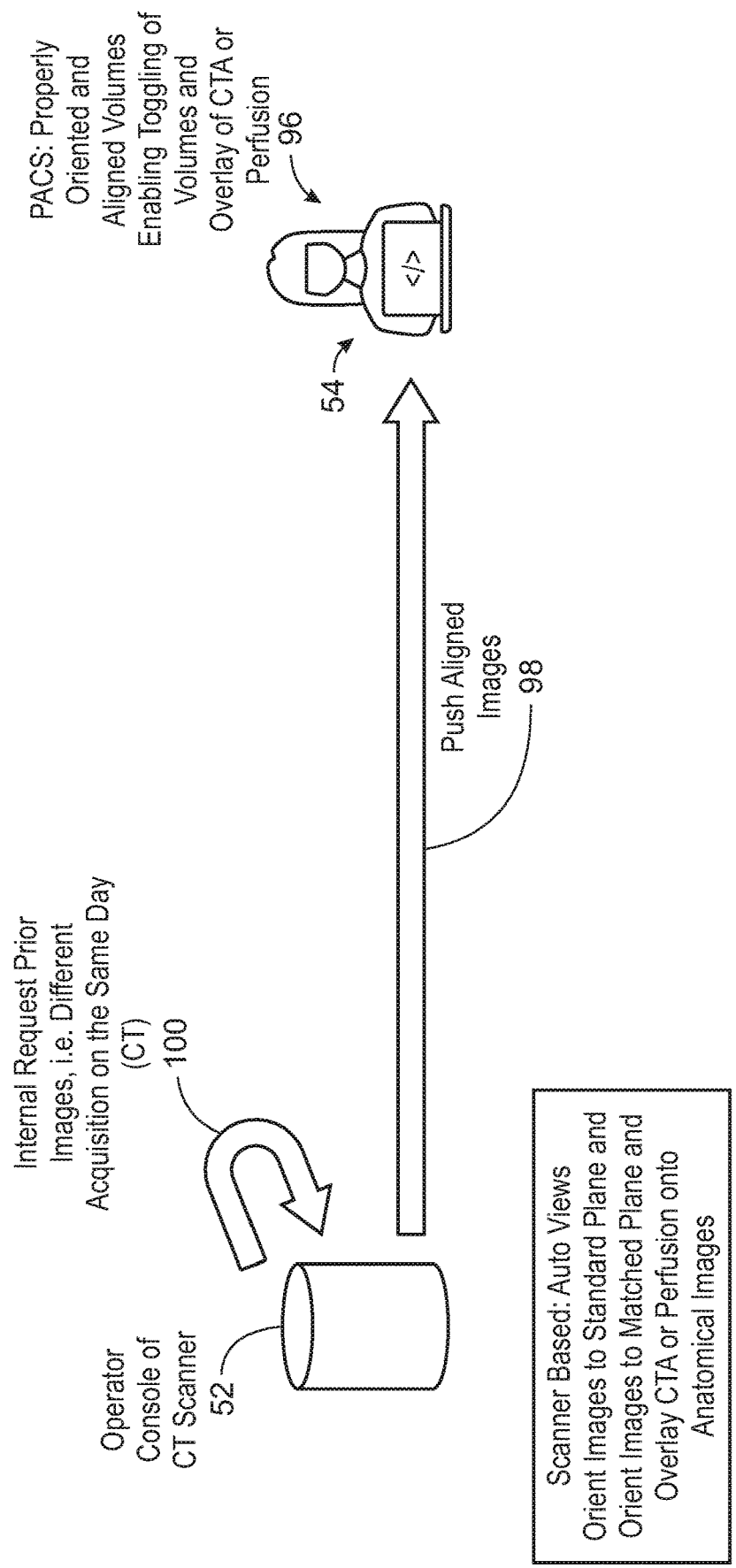
FIG. 9 is a schematic diagram of an automated workflow for a longitudinal review of imaging data (e.g., utilizing an operator console of a scanner for overlaying), in accordance with aspects of the present disclosure.

FIG. 9 is a schematic diagram of an automated workflow for a longitudinal review of imaging data (e.g., utilizing an operator console of a scanner for overlaying). The automated workflow depicted in FIG. 9 may be utilized for a time resolved imaging study utilizing CT angiography or CT perfusion. A presently or currently acquired image volume (e.g., thin slice image volume) acquired of a region of interest of a subject (e.g., patient) by the CT scanner (as part of the time resolved imaging study) is obtained or accessed by the operation console 52. In response, the operator console 52 may internally request (e.g., obtain or access (e.g., automatically)) a prior (or earlier) image volume of acquired of the same region of interest of the subject by the same CT scanner (as part of the time resolved imaging study) as indicated by the arrow 100. The prior image volume of the subject may be a non-contrast image volume and the present image volume may be a contrast image volume.

The operator console 52 then automatically aligns the presently acquired image volume and the prior image volume. In particular, the operator console 52 performs registration and transformation between the presently acquired image volume and the prior image volume to generate aligned image volumes. In particular, the operator console 52 automatically aligns the image volumes by straightening image volumes and orientating the images volumes to a standard plane (e.g., axial planes perpendicular to table or planes related to anatomy that are created) and a matched plane (e.g., same orientation as the earlier image volume). In certain embodiments, the operator console 52 may also perform a thickening operation on the image volumes. The operator console 52 also overlays a color image (CT angiography or CT perfusion overlay derived from the contrast image volume) on at least one of the aligned images or image volumes (e.g., the aligned image volume of the earlier non-contrast image volume).

The operator console 52 then transfers or pushes (e.g., automatically) the aligned image volumes and the CT angiography or CT perfusion overlay on anatomical images (e.g., color image) to a workstation 96 of the PACS 54 for viewing as indicated by arrow 98. On the workstation 96, the user (e.g., radiologist) may switch or toggle between the properly oriented and aligned image volumes as well as the CT angiography or CT perfusion overlay on anatomical images utilizing an input device of the workstation 96.

Figure 10:
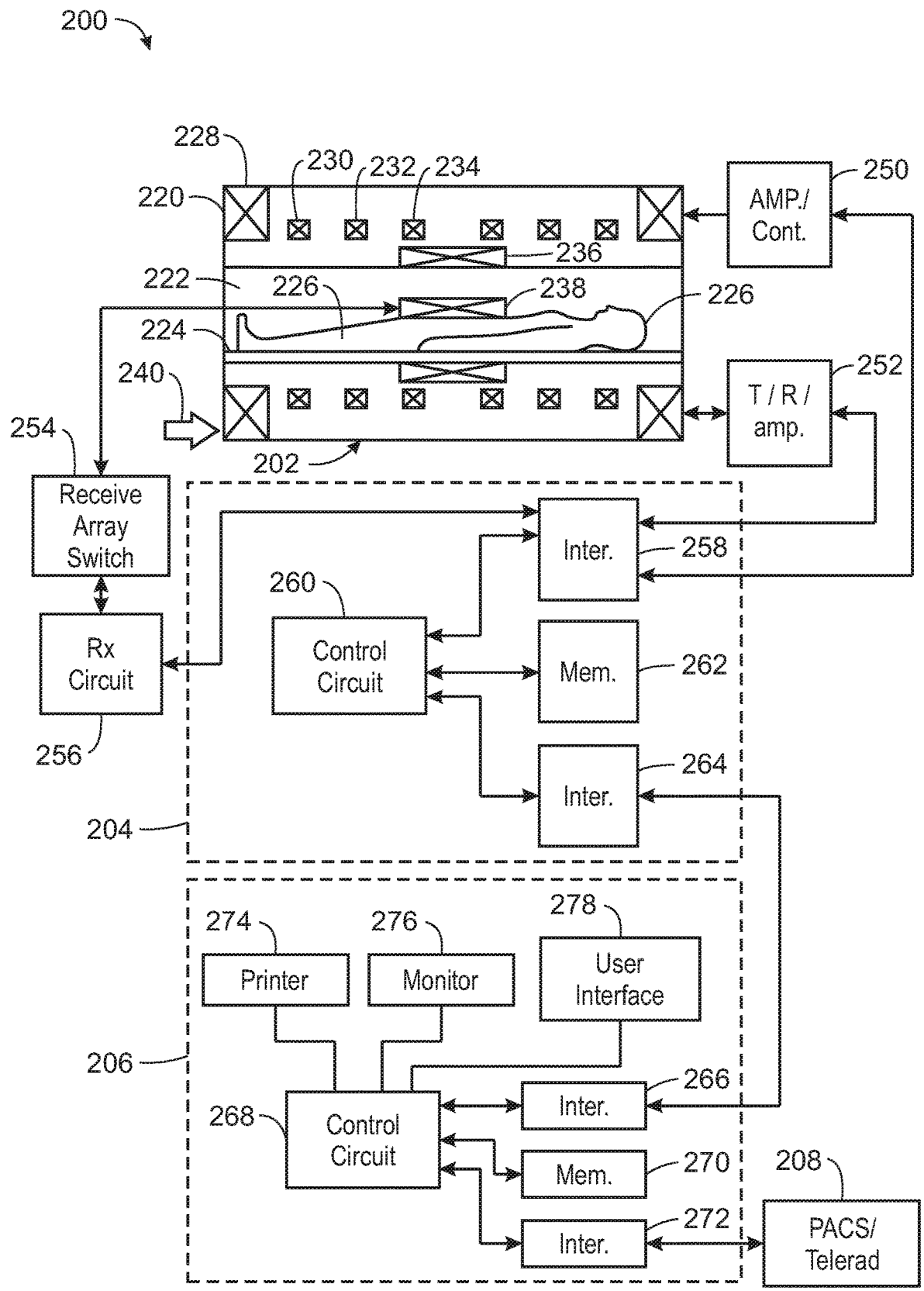
FIG. 10 is a schematic view of a magnetic resonance imaging (MRI) system suitable for use with the disclosed techniques.
Figure 11:
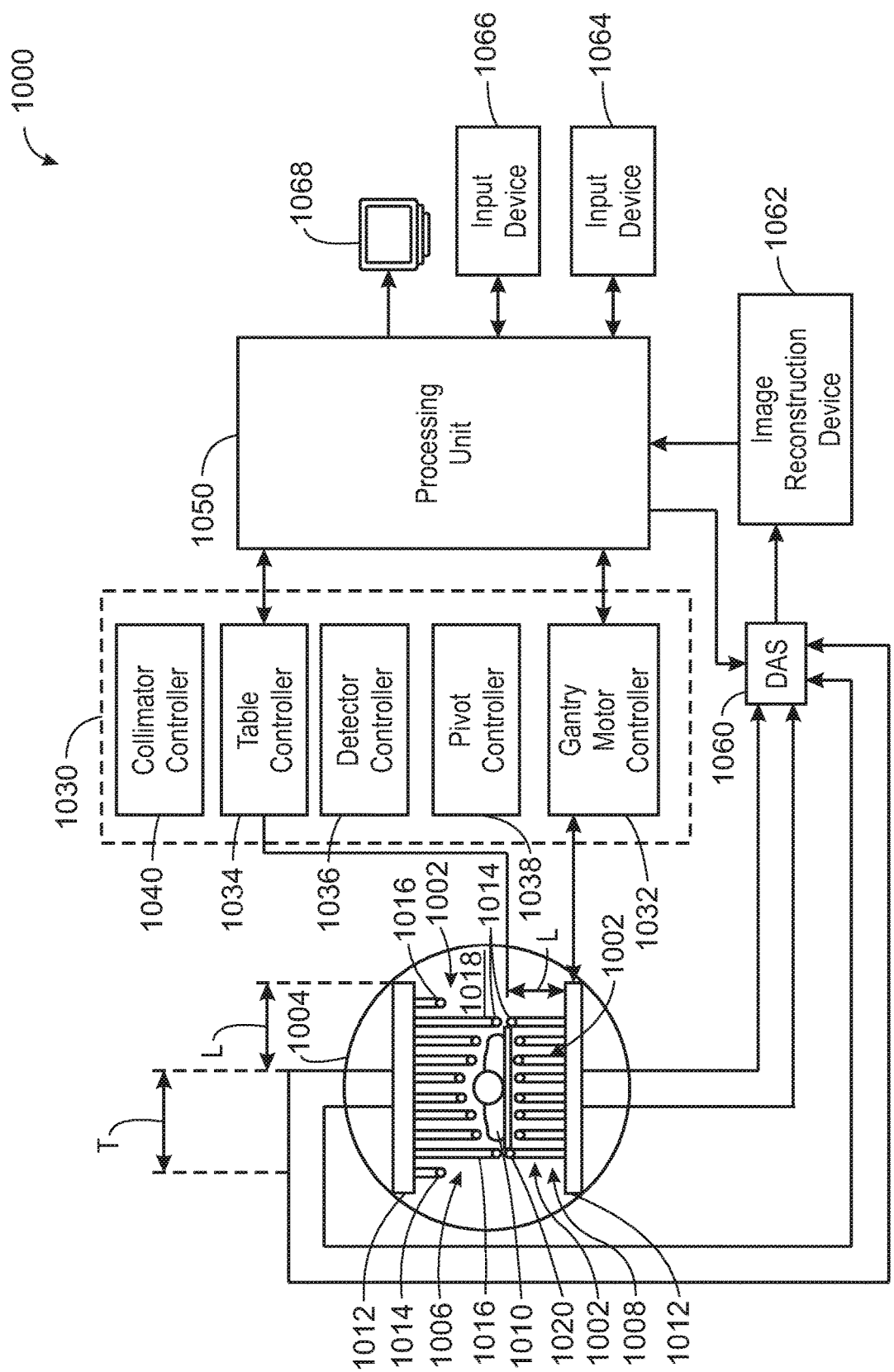
FIG. 11 is a schematic view of nuclear medicine imaging system suitable for use with the disclosed techniques.

FIGS. 10 and 11 illustrate other types of medical imaging systems that may be utilized with the techniques described in the present disclosure. FIG. 10 is a magnetic resonance imaging (MRI) system 200 is illustrated schematically as including a scanner 202, scanner control circuitry 204, and system control circuitry 206. According to the embodiments described herein, the MRI system 200 is generally configured to perform MR imaging.

System 200 additionally includes remote access and storage systems or devices such as picture archiving and communication systems (PACS) 208, or other devices such as teleradiology equipment so that data acquired by the system 200 may be accessed on- or off-site. In this way, MR data may be acquired, followed by on- or off-site processing and evaluation. While the MRI system 200 may include any suitable scanner or detector, in the illustrated embodiment, the system 200 includes a full body scanner 202 having a housing 220 through which a bore 222 is formed. A table 224 is moveable into the bore 222 to permit a patient 226 (e.g., subject) to be positioned therein for imaging selected anatomy within the patient.

Scanner 202 includes a series of associated coils for producing controlled magnetic fields for exciting the gyromagnetic material within the anatomy of the patient being imaged. Specifically, a primary magnet coil 228 is provided for generating a primary magnetic field, Bo, which is generally aligned with the bore 222. A series of gradient coils 230, 232, and 234 permit controlled magnetic gradient fields to be generated for positional encoding of certain gyromagnetic nuclei within the patient 226 during examination sequences. A radio frequency (RF) coil 236 (e.g., RF transmit coil) is configured to generate radio frequency pulses for exciting the certain gyromagnetic nuclei within the patient. In addition to the coils that may be local to the scanner 202, the system 200 also includes a set of receiving coils or RF receiving coils 238 (e.g., an array of coils) configured for placement proximal (e.g., against) to the patient 226. As an example, the receiving coils 238 can include cervical/thoracic/lumbar (CTL) coils, head coils, single-sided spine coils, and so forth. Generally, the receiving coils 238 are placed close to or on top of the patient 226 so as to receive the weak RF signals (weak relative to the transmitted pulses generated by the scanner coils) that are generated by certain gyromagnetic nuclei within the patient 226 as they return to their relaxed state.

The various coils of system 200 are controlled by external circuitry to generate the desired field and pulses, and to read emissions from the gyromagnetic material in a controlled manner. In the illustrated embodiment, a main power supply 240 provides power to the primary field coil 228 to generate the primary magnetic field, Bo. A power input (e.g., power from a utility or grid), a power distribution unit (PDU), a power supply (PS), and a driver circuit 250 may together provide power to pulse the gradient field coils 230, 232, and 234. The driver circuit 250 may include amplification and control circuitry for supplying current to the coils as defined by digitized pulse sequences output by the scanner control circuitry 204.

Another control circuit 252 is provided for regulating operation of the RF coil 236. Circuit 252 includes a switching device for alternating between the active and inactive modes of operation, wherein the RF coil 236 transmits and does not transmit signals, respectively. Circuit 252 also includes amplification circuitry configured to generate the RF pulses. Similarly, the receiving coils 238 are connected to switch 254, which is capable of switching the receiving coils 238 between receiving and non-receiving modes. Thus, the receiving coils 238 resonate with the RF signals produced by relaxing gyromagnetic nuclei from within the patient 226 while in the receiving mode, and they do not resonate with RF energy from the transmitting coils (i.e., coil 236) so as to prevent undesirable operation while in the non-receiving mode. Additionally, a receiving circuit 256 is configured to receive the data detected by the receiving coils 238 and may include one or more multiplexing and/or amplification circuits.

It should be noted that while the scanner 202 and the control/amplification circuitry described above are illustrated as being coupled by a single line, many such lines may be present in an actual instantiation. For example, separate lines may be used for control, data communication, power transmission, and so on. Further, suitable hardware may be disposed along each type of line for the proper handling of the data and current/voltage. Indeed, various filters, digitizers, and processors may be disposed between the scanner and either or both of the scanner and system control circuitry 204, 206.

As illustrated, scanner control circuitry 204 includes an interface circuit 258, which outputs signals for driving the gradient field coils and the RF coil and for receiving the data representative of the magnetic resonance signals produced in examination sequences. The interface circuit 258 is coupled to a control and analysis circuit 260. The control and analysis circuit 260 executes the commands for driving the circuit 250 and circuit 252 based on defined protocols selected via system control circuit 206.

Control and analysis circuit 260 also serves to receive the magnetic resonance signals and performs subsequent processing before transmitting the data to system control circuit 206. Scanner control circuit 204 also includes one or more memory circuits 262, which store configuration parameters, pulse sequence descriptions, examination results, and so forth, during operation.

Interface circuit 264 is coupled to the control and analysis circuit 260 for exchanging data between scanner control circuitry 204 and system control circuitry 206. In certain embodiments, the control and analysis circuit 260, while illustrated as a single unit, may include one or more hardware devices. The system control circuit 206 includes an interface circuit 266, which receives data from the scanner control circuitry 204 and transmits data and commands back to the scanner control circuitry 204. The control and analysis circuit 268 may include a CPU in a multi-purpose or application specific computer or workstation. Control and analysis circuit 268 is coupled to a memory circuit 270 to store programming code for operation of the MRI system 200 and to store the processed image data for later reconstruction, display and transmission. The programming code may execute one or more algorithms that, when executed by a processor, are configured to perform reconstruction of acquired data as described below. In certain embodiments, image reconstruction may occur on a separate computing device having processing circuitry and memory circuitry.

An additional interface circuit 272 may be provided for exchanging image data, configuration parameters, and so forth with external system components such as remote access and storage devices 208. Finally, the system control and analysis circuit 268 may be communicatively coupled to various peripheral devices for facilitating operator interface and for producing hard copies of the reconstructed images. In the illustrated embodiment, these peripherals include a printer 274, a monitor 276, and user interface 278 including devices such as a keyboard, a mouse, a touchscreen (e.g., integrated with the monitor 276), and so forth.

FIG. 11 is a schematic illustration of a NM imaging system 1000 having a plurality of imaging detector head assemblies mounted on a gantry (which may be mounted, for example, in rows, in an iris shape, or other configurations, such as a configuration in which the movable detector carriers 1016 are aligned radially toward the patient-body 1010). It should be noted that the arrangement of FIG. 11 is provided by way of example for illustrative purposes, and that other arrangements (e.g., detector arrangements) may be employed in various embodiments. In the illustrated example, a plurality of imaging detectors 1002 are mounted to a gantry 1004. In the illustrated embodiment, the imaging detectors 1002 are configured as two separate detector arrays 1006 and 1008 coupled to the gantry 1004 above and below a subject 1010 (e.g., a patient), as viewed in FIG. 11. The detector arrays 1006 and 1008 may be coupled directly to the gantry 1004, or may be coupled via support members 1012 to the gantry 1004 to allow movement of the entire arrays 1006 and/or 1008 relative to the gantry 1004 (e.g., transverse translating movement in the left or right direction as viewed by arrow T in FIG. 11). Additionally, each of the imaging detectors 1002 includes a detector unit 1014, at least some of which are mounted to a movable detector carrier 1016 (e.g., a support arm or actuator that may be driven by a motor to cause movement thereof) that extends from the gantry 1004. In some embodiments, the detector carriers 1016 allow movement of the detector units 1014 towards and away from the subject 1010, such as linearly. Thus, in the illustrated embodiment the detector arrays 1006 and 1008 are mounted in parallel above and below the subject 1010 and allow linear movement of the detector units 1014 in one direction (indicated by the arrow L), illustrated as perpendicular to the support member 1012 (that are coupled generally horizontally on the gantry 1004). However, other configurations and orientations are possible as described herein. It should be noted that the movable detector carrier 1016 may be any type of support that allows movement of the detector units 1014 relative to the support member 1012 and/or gantry 1004, which in various embodiments allows the detector units 1014 to move linearly towards and away from the support member 1012.

Each of the imaging detectors 1002 in various embodiments is smaller than a conventional whole body or general purpose imaging detector. A conventional imaging detector may be large enough to image most or all of a width of a patient's body at one time and may have a diameter or a larger dimension of approximately 50 cm or more. In contrast, each of the imaging detectors 1002 may include one or more detector units 1014 coupled to a respective detector carrier 1016 and having dimensions of, for example, 4 cm to 20 cm and may be formed of Cadmium Zinc Telluride (CZT) tiles or modules, or other semiconductor detector materials, such as Cadmium Telluride (CdTe) or Silicon (Si). For example, each of the detector units 1014 may be 8×8 cm in size and be composed of a plurality of CZT or other semiconductor detector material pixelated modules (not shown). For example, each module may be 4×4 cm in size and have 16×16=256 pixels (pixelated modules). In some embodiments, each detector unit 1014 includes a plurality of modules, such as an array of 1×7 modules. However, different configurations and array sizes are contemplated including, for example, detector units 1014 having multiple rows of modules. It should be understood that the imaging detectors 1002 may be different sizes and/or shapes with respect to each other, such as square, rectangular, circular or other shape. An actual field of view (FOV) of each of the imaging detectors 1002 may be directly proportional to the size and shape of the respective imaging detector.

The gantry 1004 may be formed with an aperture 1018 (e.g., opening or bore) therethrough as illustrated. A patient table 1020, such as a patient bed, is configured with a support mechanism (not shown) to support and carry the subject 1010 in one or more of a plurality of viewing positions within the aperture 1018 and relative to the imaging detectors 1002. Alternatively, the gantry 1004 may comprise a plurality of gantry segments (not shown), each of which may independently move a support member 1012 or one or more of the imaging detectors 1002.

The gantry 1004 may also be configured in other shapes, such as a "C", "H" and "L", for example, and may be rotatable about the subject 1010. For example, the gantry 1004 may be formed as a closed ring or circle, or as an open arc or arch which allows the subject 1010 to be easily accessed while imaging and facilitates loading and unloading of the subject 1010, as well as reducing claustrophobia in some subjects 1010.

Additional imaging detectors (not shown) may be positioned to form rows of detector arrays or an arc or ring around the subject 1010. By positioning multiple imaging detectors 1002 at multiple positions with respect to the subject 1010, such as along an imaging axis (e.g., head to toe direction of the subject 1010) image data specific for a larger FOV may be acquired more quickly. Each of the imaging detectors 1002 has a radiation detection face, which is directed towards the subject 1010 or a region of interest within the subject.

A controller unit 1030 may control the movement and positioning of the patient table 1020, imaging detectors 1002 (which may be configured as one or more arms), and/or gantry 1004. A range of motion before or during an acquisition, or between different image acquisitions, is set to maintain the actual FOV of each of the imaging detectors 1002 directed, for example, towards or "aimed at" a particular area or region of the subject 1010 or along the entire subject 1010. The motion may be a combined or complex motion in multiple directions simultaneously, concurrently, or sequentially.

The controller unit 1030 may have a gantry motor controller 1032, table controller 1034, detector controller 1036, pivot controller 1038, and collimator controller 1040. The controllers 1030, 1032, 1034, 1036, 1038, and 1040 may be automatically commanded by a processing unit 1050, manually controlled by an operator, or a combination thereof. The gantry motor controller 1032 may move the imaging detectors 1002 with respect to the subject 1010, for example, individually, in segments or subsets, or simultaneously in a fixed relationship to one another. For example, in some embodiments, the gantry controller 1032 may cause the imaging detectors 1002 and/or support members 1012 to move relative to or rotate about the subject 1010, which may include motion of less than or up to 180 degrees (or more).

The table controller 1034 may move the patient table 1020 to position the subject 1010 relative to the imaging detectors 1002. The patient table 1020 may be moved in up-down directions, in-out directions, and right-left directions, for example. The detector controller 1036 may control movement of each of the imaging detectors 1002 to move together as a group or individually. The detector controller 1036 also may control movement of the imaging detectors 1002 in some embodiments to move closer to and farther from a surface of the subject 1010, such as by controlling translating movement of the detector carriers 1016 linearly towards or away from the subject 1010 (e.g., sliding or telescoping movement). Optionally, the detector controller 1036 may control movement of the detector carriers 1016 to allow movement of the detector array 1006 or 1008. For example, the detector controller 1036 may control lateral movement of the detector carriers 1016 illustrated by the T arrow. In various embodiments, the detector controller 1036 may control the detector carriers 1016 or the support members 1012 to move in different lateral directions. Detector controller 1036 may control the swiveling motion of detectors 1002 together. In some embodiments, detectors 1002 may swivel or rotate around an axis.

The pivot controller 1038 may control pivoting or rotating movement of the detector units 1014 at ends of the detector carriers 1016 and/or pivoting or rotating movement of the detector carrier 1016. For example, one or more of the detector units 1014 or detector carriers 1016 may be rotated about at least one axis to view the subject 1010 from a plurality of angular orientations to acquire, for example, 3D image data in a 3D SPECT or 3D imaging mode of operation. The collimator controller 1040 may rotate a detector column between two different collimators configured for two different energy applications (e.g., high energy versus low energy).

It should be noted that motion of one or more imaging detectors 1002 may be in directions other than strictly axially or radially, and motions in several motion directions may be used in various embodiment. Therefore, the term "motion controller" may be used to indicate a collective name for all motion controllers. It should be noted that the various controllers may be combined, for example, the detector controller 1036 and pivot controller 1038 may be combined to provide the different movements described herein.

Prior to acquiring an image of the subject 1010 or a portion of the subject 1010, the imaging detectors 1002, gantry 1004, and/or patient table 1020 may be adjusted, such as to first or initial imaging positions, as well as subsequent imaging positions. The imaging detectors 1002 may each be positioned to image a portion of the subject 1010. Alternatively, for example in a case of a small size subject 1010, one or more of the imaging detectors 1002 may not be used to acquire data, such as the imaging detectors 1002 at ends of the detector array 1006 and 1008, which as illustrated in FIG. 11 are in a retracted position away from the subject 1010. Positioning may be accomplished manually by the operator and/or automatically, which may include using, for example, image information such as other images acquired before the current acquisition, such as by another imaging modality such as X-ray Computed Tomography (CT), MRI, X-Ray, PET or ultrasound. In some embodiments, the additional information for positioning, such as the other images, may be acquired by the same system, such as in a hybrid system (e.g., a SPECT/CT system). Additionally, the detector units 1014 may be configured to acquire non-NM data, such as X-ray CT data. In some embodiments, a multi-modality imaging system may be provided, for example, to allow performing NM or SPECT imaging, as well as X-ray CT imaging, which may include a dual-modality or gantry design as described in more detail herein.

After the imaging detectors 1002, gantry 1004, and/or patient table 1020 are positioned, one or more images, such as three-dimensional (3D) SPECT images are acquired using one or more of the imaging detectors 1002, which may include using a combined motion that reduces or minimizes spacing between detector units 1014. The image data acquired by each imaging detector 1002 may be combined and reconstructed into a composite image or 3D images in various embodiments.

In one embodiment, at least one of detector arrays 1006 and/or 1008, gantry 1004, and/or patient table 1020 are moved after being initially positioned, which includes individual movement of one or more of the detector units 1014 (e.g., combined lateral and pivoting movement) together with the swiveling motion of detectors 1002. For example, at least one of detector arrays 1006 and/or 1008 may be moved laterally while pivoted. Thus, in various embodiments, a plurality of small sized detectors, such as the detector units 1014 may be used for 3D imaging, such as when moving or sweeping the detector units 1014 in combination with other movements.

In various embodiments, a data acquisition system (DAS) 1060 receives electrical signal data produced by the imaging detectors 1002 and converts this data into digital signals for subsequent processing. However, in various embodiments, digital signals are generated by the imaging detectors 1002. An image reconstruction device 1062 (which may be a processing device or computer) and a data storage device 1064 may be provided in addition to the processing unit 1050. It should be noted that one or more functions related to one or more of data acquisition, motion control, data processing and image reconstruction may be accomplished through hardware, software and/or by shared processing resources, which may be located within or near the imaging system 1000, or may be located remotely. Additionally, a user input device 1066 may be provided to receive user inputs (e.g., control commands), as well as a display 1068 for displaying images. DAS 1060 receives the acquired images from detectors 1002 together with the corresponding lateral, vertical, rotational and swiveling coordinates of gantry 1004, support members 1012, detector units 1014, detector carriers 1016, and detectors 1002 for accurate reconstruction of an image including 3D images and their slices.

Technical effects of the disclosed embodiments include providing an automatic workflow for performing a longitudinal review of medical imaging data. In particular, the disclosed embodiments provide an automatic workflow for radiologists to compare present images to previous images under similar conditions or parameters. As a result, the disclosed embodiments reduce the time needed to conduct a longitudinal review of the medical imaging data of a patient.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

This written description uses examples to disclose the present subject matter, including the best mode, and also to enable any person skilled in the art to practice the subject matter, including making and using any devices or systems and performing any incorporated methods. The patentable scope of the subject matter is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A computer-implemented method for automatically performing a longitudinal review of medical imaging data via one or more processors, comprising:
obtaining, at a computing device, a first image volume acquired of a subject with a medical imaging system of an imaging modality;
obtaining, at the computing device, a second image volume acquired of the subject with the medical imaging system or another medical imaging system of the imaging modality or a different imaging modality, wherein the first image volume was acquired at an earlier time point than the second image volume;
automatically aligning, via the computing device, the second image volume to the first image volume to generate aligned image volumes, wherein the first image volume is obtained from a picture archiving and communication system (PACS) and the computing device is separate from the PACS and an operator console of the medical imaging system or the another medical imaging system, wherein automatically aligning the second image volume and the first image volume comprises performing registration and transformation between the first image volume and the second image volume;

orienting, via the computing device, the aligned image volumes to a standard anatomical plane and a matched plane corresponding to the orientation of the first image volume;

generating, via the computing device, one or more difference images based on the aligned image volumes;

overlaying, via the computing device, a color image derived from one of the image volumes onto the other image volume or the difference image;

transferring, via the computing device, the aligned image volumes, the difference image, and the overlay to the PACS; and enabling, via the computing device, toggle functionality between the aligned image volumes, the difference image, and the overlay via an input device of the computing device for viewing on a display of the computing device.

2. A system for automatically performing a longitudinal review of medical imaging data, comprising:
one or more memories encoding processor-executable routines; and
one or more processors configured to access the one or more memories and to execute the processor-executable routines, wherein the routines, when executed by the one or more processors, cause the one or more processors to:
obtain, at a computing device, a first image volume acquired of a subject with a medical imaging system of an imaging modality;
obtain, at the computing device, a second image volume acquired of the subject with the medical imaging system or another medical imaging system of the imaging modality or a different imaging modality, wherein the first image volume was acquired at an earlier time point than the second image volume;
automatically align, via the computing device, the second image volume to the first image volume to generate aligned image volumes, wherein the first image volume is obtained from a picture archiving and communication system (PACS) and the computing device comprises an operator console of the medical imaging system or the another medical imaging system, wherein automatically aligning the second image volume and the first image volume comprises performing registration and transformation between the first image volume and the second image volume;
orient the aligned image volumes to a standard anatomical plane and a matched plane corresponding to the orientation of the first image volume;

generate one or more difference images based on the aligned image volumes;

overlay a color image derived from one of the image volumes onto the other image volume or the difference image;

transfer the aligned image volumes, the difference image, and the overlay to the PACS; and enable toggle functionality between the aligned image volumes, the difference image, and the overlay via an input device of the computing device for viewing on a display of the computing device.

3. A non-transitory computer-readable medium, the computer-readable medium comprising processor-executable code that when executed by one or more processors, causes the one or more processors to:
obtain, at a computing device, a first image volume acquired of a subject with a medical imaging system of an imaging modality;
obtain, at the computing device, a second image volume acquired of the subject with the medical imaging system or another medical imaging system of the imaging modality or a different imaging modality, wherein the first image volume was acquired at an earlier time point than the second image volume; and
automatically align, via the computing device, the second image volume to the first image volume to generate aligned image volumes, wherein the first image volume is obtained from an operator console of the medical imaging system or the another medical imaging system, the computing device is the operator console, and wherein automatically aligned the second image volume and the first image volume comprises performing registration, transformation, and image overlaying between the first image volume and the second image volume;
orient the aligned image volumes to a standard anatomical plane and a matched plane corresponding to the orientation of the first image volume;
generate one or more difference images based on the aligned image volumes;
overlay a color image derived from one of the image volumes onto the other image volume or the difference image;
transfer the aligned image volumes, the difference image, and the overlay to the PACS; and
enable toggle functionality between the aligned image volumes, the difference image, and the overlay via an input device of the computing device for viewing on a display of the computing device.

* * * * *